(12) United States Patent
Li et al.

(10) Patent No.: US 11,349,824 B2
(45) Date of Patent: May 31, 2022

(54) BLOCK SEQUENCING METHOD AND SYSTEM BASED ON TREE-GRAPH STRUCTURE, AND DATA PROCESSING TERMINAL

(71) Applicant: Shanghai Tree-Graph Blockchain Research Institute, Shanghai (CN)

(72) Inventors: Chenxing Li, Hangzhou (CN); Peilun Li, Hangzhou (CN); Zhe Yang, Hangzhou (CN); Guang Yang, Hangzhou (CN); Dong Zhou, Hangzhou (CN); Ming Wu, Hangzhou (CN); Fan Long, Hangzhou (CN); Shang Shu, Hangzhou (CN)

(73) Assignee: Shanghai Tree-Graph Blockchain Research Institute, Shanghai (CN)

( * ) Notice: Subject to any disclaimer, the term of this patent is extended or adjusted under 35 U.S.C. 154(b) by 232 days.

(21) Appl. No.: 16/738,890

(22) Filed: Jan. 9, 2020

(65) Prior Publication Data
US 2021/0058382 A1 Feb. 25, 2021

(30) Foreign Application Priority Data
Aug. 20, 2019 (CN) .......................... 201910769588.X

(51) Int. Cl.
| | |
|---|---|
| *H04L 9/40* | (2022.01) |
| *G06F 16/901* | (2019.01) |
| *H04L 9/06* | (2006.01) |
| *H04L 67/104* | (2022.01) |

(52) U.S. Cl.
CPC .......... *H04L 63/08* (2013.01); *G06F 16/9027* (2019.01); *H04L 9/0637* (2013.01); *H04L 67/104* (2013.01); *H04L 2209/38* (2013.01)

(58) Field of Classification Search
CPC ...................................................... H04L 63/08
USPC ............................................................ 726/6
See application file for complete search history.

(56) References Cited

U.S. PATENT DOCUMENTS

| | | | | |
|---|---|---|---|---|
| 9,529,836 | B1* | 12/2016 | Hale | .................. G06F 11/3604 |
| 9,774,401 | B1* | 9/2017 | Borrill | .................. H04L 9/0852 |
| 10,685,064 | B2* | 6/2020 | Johnson | .............. G06F 16/9024 |
| 10,810,258 | B1* | 10/2020 | Niewiadomski | .... G06F 16/9027 |
| 11,165,582 | B2* | 11/2021 | Boneh | .................. H04L 9/3218 |
| 11,222,074 | B2* | 1/2022 | Ganz | ....................... H04L 67/10 |
| 2005/0288928 | A1* | 12/2005 | Bergl | .................... G10L 15/083 |
| | | | | 704/E15.038 |

(Continued)

*Primary Examiner* — Dant B Shaifer Harriman
(74) *Attorney, Agent, or Firm* — Tianchen LLC.; Yuan R. Li; Yi Fan Yin

(57) ABSTRACT

The present invention relates to a block sequencing method based on a tree-graph structure, comprising of: linking all blocks into a tree-graph structure according to reference relationships; selecting one pivot chain from the tree-graph structure and taking all blocks in the pivot chain as pivot blocks; dividing all blocks into a plurality of Epochs according to a time sequence arrangement of the pivot blocks; sorting the blocks in the Epoch to obtain a set sequence of the Epoch in time sequence; and obtaining a global sequence of all blocks of the tree-graph structure based on all set sequences. The present invention also relates to a block sequencing system based on the tree-graph structure, a data processing terminal for sequencing blocks by the block sequencing method, and a P2P network using the data processing terminal.

13 Claims, 4 Drawing Sheets

(56) References Cited

U.S. PATENT DOCUMENTS

| | | | |
|---|---|---|---|
| 2008/0231633 A1* | 9/2008 | Keller | G06T 15/40 |
| | | | 345/426 |
| 2016/0012152 A1* | 1/2016 | Johnson | G06F 16/9024 |
| | | | 707/798 |
| 2019/0079820 A1* | 3/2019 | Anchuri | G06F 11/079 |
| 2019/0354518 A1* | 11/2019 | Zochowski | G06F 16/2379 |
| 2019/0354962 A1* | 11/2019 | Spector | G06Q 20/3678 |
| 2020/0052887 A1* | 2/2020 | Fitzgerald | H04L 9/0637 |
| 2020/0278972 A1* | 9/2020 | Zhou | G06F 16/2465 |
| 2021/0091957 A1* | 3/2021 | Ford | H04L 67/10 |
| 2021/0097061 A1* | 4/2021 | Amihod | G06F 16/2322 |
| 2021/0263913 A1* | 8/2021 | Boodman | G06F 16/2246 |
| 2021/0279280 A1* | 9/2021 | M G | G06F 16/9024 |

\* cited by examiner

---the prior art---

---the prior art---

BLOCK SEQUENCING METHOD AND SYSTEM BASED ON TREE-GRAPH STRUCTURE, AND DATA PROCESSING TERMINAL

CROSS-REFERENCE TO RELATED APPLICATION

This application claims priority of Chinese patent application serial No. 201910769588.X. The entirety of each of the above-mentioned patent applications is hereby incorporated herein by reference and made a part of this specification.

TECHNICAL FIELD

The invention relates to a field of internet technology, particularly relates to a block processing method and system in a blockchain network.

BACKGROUND

At present, the common blockchain consensus algorithms are designed based on a chain structure, and only one block can obtain the consensus of the whole network in each time period. Such structure is difficult to fully exert the computing capability and bandwidth resources of the whole network, resulting in that a throughput of the system arrives at a bottleneck.

As we know, the mainstream blockchain structure is the chain structure in the blockchain system, and there is also a blockchain system organized by DAG (Directed Acyclic Graph) structure.

The chain structure: Bitcoin and Ethereum, for example, are both chain structures, as shown in FIG. 1. Under the chain structure, each block has a unique parent edge. Under the consensus rule, only one chain can obtain the consensus of the whole network to ensure the consistency of data. "A DATA PROCESSING METHOD, A DATA PROCESSING SERVER AND A STORAGE MEDIUM" (application number: 201711044177.1) which is a China national application discloses a data processing method comprising of: receiving target data uploaded by a target node, wherein the target data carries a digital signature of the target node; transmitting the target data to nodes other than the target node in the data processing system, such that the other nodes authenticate the target data; if the authentication for the target data is successful, generating a target block containing the target data; and writing the target block into a blockchain. The embodiment of the present invention also discloses a data processing server and a computer readable storage medium. The present invention can realize the reliable storage of the target data by the encryption characteristic of the blockchain, prevent the target data from being tampered, and provide the real and reliable data information to a data user when the data user requests the target data. In the blockchain system of the chain structure, only one chain can obtain the consensus of the whole network, which means that only one block can finally obtain the consensus of the whole network, among the new blocks generated in each time period. As a result, the computing capability resources, and bandwidth resources of the whole network occupied by other blocks are wasted and the system throughput is not high.

DAG structure: for example, Phantom is a DAG structure, as shown in FIG. 2. Under the DAG structure, each block has reference edges for a plurality of other known blocks instead of having a unique parent edge. Under the consensus rule, a subgraph in the DAG graph will obtain the consensus of the whole network to ensure the consistency of data. "A TRANSACTION SEQUENCING METHOD AND DEVICE OF A BLOCKCHAIN BASED ON DAG" (application number: 201811561134.5) which is a China national application, discloses a transaction sequencing method and device of a blockchain based on DAG, wherein a blockchain based on DAG includes a plurality of transaction blocks and one or more sequencing blocks, and for each sequencing block, the transaction blocks directly referenced by the sequencing block and a part of transaction blocks indirectly referenced by the sequencing block can be determined, the method comprises of: numbering a sequencing block generated latest among the blockchain according to time sequence for generating sequencing blocks to form a sequencing block ID; saving the sequencing block ID, as a transaction height, in header information of the corresponding sequencing block; determining the transaction height of any transaction block based on a transaction height determination rule of the transaction blocks; sorting, according to an execution sequence standard, a plurality of first class transaction blocks with the same transaction height as the sequencing block to form a transaction sequence; executing, according to the transaction sequence, smart contract transactions in all the first class transaction blocks that exist in the transaction sequence. In the blockchain system with a DAG structure, all edges are reference edges without parent edge, and there is no main chain, resulting in that it is complicated to determine sequence of blocks in the DAG. Phantom selects a special connected subgraph in the DAG by a greedy k-cluster algorithm, discards blocks other than the subgraph, and determines sequence in the subgraph by topological sorting. Obviously, although the blocks are organized into a DAG structure, the algorithm complexity is high for the blocks in the DAG and a part of blocks are discarded in the sequencing process, which results in the decrease of block utilization rate and the waste of the computing capability resources and bandwidth resources of the whole network.

SUMMARY

The present disclosure aims to overcome the defects in the prior art, the invention aims to provide a block sequencing method and system based on tree-graph structure, and data processing terminal. The present invention replaces the chain structure with a tree-graph structure to increase the number of blocks that can obtain the consensus of the whole network in each time period and improve the throughput of the system.

Specifically, the method comprises of: linking all blocks into a tree-graph structure according to reference relationships; selecting one pivot chain from the tree-graph structure and taking all blocks in the pivot chain as pivot blocks; dividing, according to a time sequence arrangement of the pivot blocks, all blocks into a plurality of Epochs (block sets); sorting, in time sequence, the blocks in the Epoch to obtain a set sequence of the Epoch; and obtaining a global sequence of all blocks of the tree-graph structure based on all set sequences.

The block sequencing method based on the tree-graph structure described in the present invention selects the pivot chain by a heaviest subtree rule, wherein the heaviest subtree rule comprises of: for any block of the tree-graph structure, selecting a subtree structure in which the block is taken as an initial block, accumulating the number of child blocks and descendant blocks in the subtree structure, and taking the accumulated result as a weight of the block; selecting, from a genesis block of the tree-graph structure as beginning, the child block with the largest weight among all child blocks of the current block as a pivot block of the current block, and taking an edge where the current block and its pivot blocks are located as a pivot edge; and taking a single chain formed by connecting the pivot block with the pivot edge as a pivot chain.

In the block sequencing method based on the tree-graph structure described in the present invention, each Epoch includes only one of the pivot blocks.

In the block sequencing method based on the tree-graph structure described in the present invention, for any of the pivot blocks, the blocks in all parent blocks and ancient blocks that are not divided into any Epoch are divided into an Epoch of the pivot block.

In the block sequencing method based on the tree-graph structure described in the present invention, the set sequence of the Epoch is obtained according to a topological sequence of all blocks in the Epoch.

In the block sequencing method based on the tree-graph structure described in the present invention, when the topological sequences of a plurality of blocks in the Epoch are juxtaposed, hash values of the blocks of which the topological sequences are juxtaposed are sorted to determine a set sequence of the blocks in the Epoch.

The present invention also relates to a block sequencing system based on a tree-graph structure, comprises: a tree-graph structure building module for linking all blocks into a tree-graph structure according to reference relationships; a pivot chain selection module for selecting one pivot chain from the tree-graph structure, and all blocks in the pivot chain are pivot blocks; a block division module for dividing all blocks into a plurality of Epochs according to time sequence arrangement of the pivot blocks; a set sequence obtaining module for sorting, in time sequence, the blocks in each of the Epochs to obtain a set sequence of the Epoch; a global sequence obtaining module for obtaining a global sequence of all blocks of the tree-graph structure based on all set sequences.

In the block sequencing system based on the tree-graph structure described in the present invention, the pivot chain selection module selects the pivot chain by a heaviest subtree rule, wherein the heaviest subtree rule comprises of: for any block of the tree-graph structure, selecting a subtree structure in which the block is taken as an initial block, accumulating the number of child blocks and descendant blocks in the subtree structure, and taking the accumulated result as a weight of the block; selecting, from a genesis block of the tree-graph structure as beginning, the child block with the largest weight among all child blocks of the current block as a pivot block of the current block, and taking an edge where the current block and its pivot block are located as a pivot edge; and taking a single chain formed by linking the pivot block with the pivot edge as a pivot chain.

In the block sequencing system based on the tree-graph structure described in the present invention, each Epoch divided by the block division module includes only one of the pivot blocks.

In the block sequencing system based on the tree-graph structure described in the present invention, for an Epoch where any of the pivot blocks belongs, the block division module divides blocks in all parent blocks and ancient blocks that are not divided into any Epoch into an Epoch of the pivot block.

In the block sequencing system based on the tree-graph structure described in the present invention, the set sequence obtaining module includes a topological sequence obtaining submodule for obtaining the set sequence of the Epoch according to a topological sequence of all blocks in the Epoch; and a hash value sorting submodule for sorting, when the topological sequences of a plurality of blocks in the Epoch are juxtaposed, hash values of the blocks of which the topological sequences are juxtaposed to determine a set sequence of the blocks of which the topological sequences are juxtaposed in the Epoch.

The invention also relates to a readable storage medium that stores executable instructions for executing the block sequencing method based on a tree-graph structure described above.

The present invention also relates to a data processing terminal, which is used as a consensus node of a P2P network to receive, consensus authenticate and store data packets in the P2P network, comprising a readable storage medium and a processor, the processor for fetching and executing executable instructions in the readable storage medium to execute the block sequencing method based on a tree-graph structure.

The present invention also relates to a P2P network in which the consensus node is the data processing terminal described above.

According to the block sequencing method based on a tree-graph structure of the present invention, it is proposed to organize blocks in a tree-graph structure by combining advantages of a chain structure and a DAG structure and proposed a total order algorithm based on a tree-graph structure, so that each block in the tree-graph structure can obtain the consensus of the whole network.

DETAILED DESCRIPTION

In order to make the purpose, technical solution and advantages of the present invention clear, the present invention is further described in detail below in combination with the drawings and embodiments. It should be understood that the specific embodiments described herein is used only to interpret the present invention and is not intended to limit it. In addition, the technical features involved in the embodiments of the present invention described below may be combined with each other as long as they do not conflict with each other.

Figure 1:
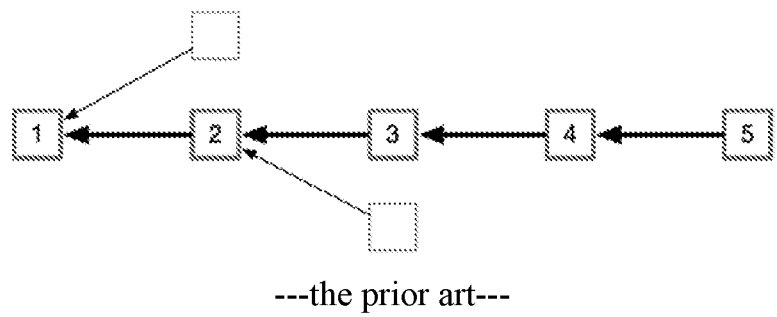
FIG. 1 is a schematic diagram of a chain structure of a blockchain in the prior art
Figure 2:
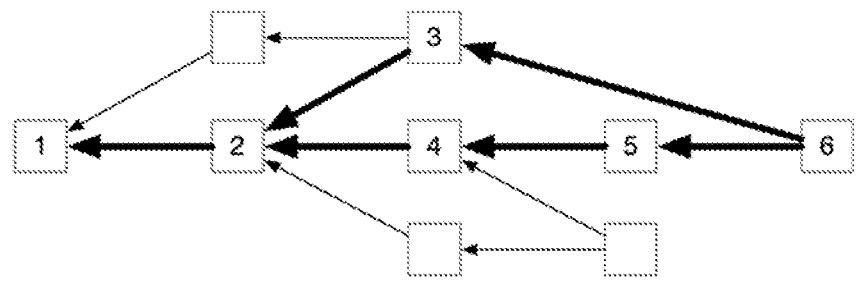
FIG. 2 is a schematic diagram of a DAG structure of a blockchain in the prior art
Figure 3:
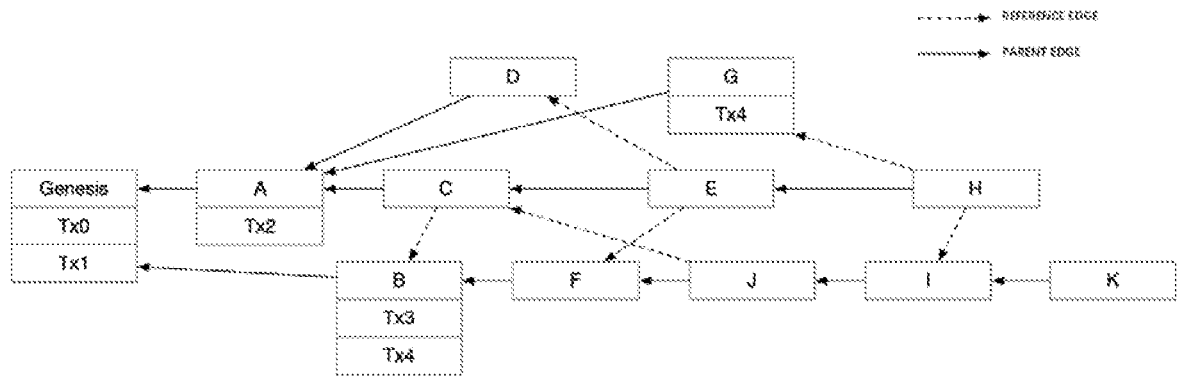
FIG. 3 is a schematic diagram of a tree-graph structure of blocks according to a preferred embodiment of the present invention

FIG. 3 is a schematic diagram of a tree-graph structure of blocks according to a preferred embodiment of the present invention. As shown in FIG. 3, in a blockchain system based on a tree-graph structure proposed in the present invention, each block except for the genesis block Genesis has a unique parent edge and a plurality of reference edges directing to the known blocks.

Figure 4:
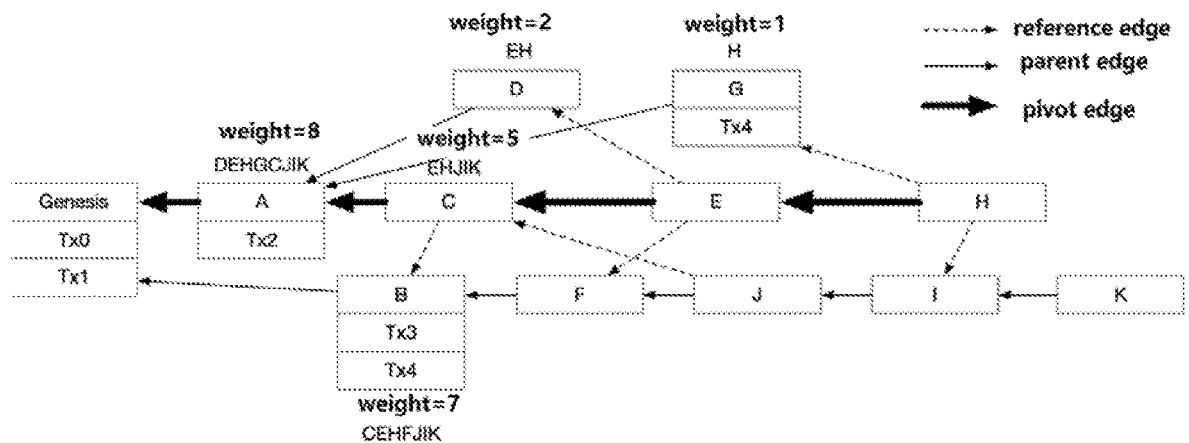
FIG. 4 is a schematic diagram of a pivot chain of a tree-graph structure of a blockchain according to a preferred embodiment of the present invention

For consensus either based on the PoW or PoS, the blocks can be organized by using the tree-graph structure shown in FIG. 3. Based on the tree-graph structure of the present invention, the method proposed in the present invention firstly determines a single chain consisting of only parent edges in the tree-graph, as a pivot chain. FIG. 4 is a schematic diagram of a pivot chain of a tree-graph structure of a blockchain according to a preferred embodiment of the present invention. As shown in FIG. 4, the blocks on the pivot chain have a definite sequence according to the parent-child relationship. When a pivot chain is determined, all the blocks are divided into sets according to reference relationships that the blocks on the pivot chain reference the blocks on a non-pivot chain, and there is only one block on the pivot chain in each set, which is called Epoch. Since there is only one block on pivot chain in the Epochs, and blocks on the pivot chain have a definite sequence, there is a definite sequence among all Epochs. Finally, in each Epoch, the sequences of all blocks within the Epoch are determined according to the extended topological sorting algorithm, to obtain a global sequence of all blocks.

Figure 5:
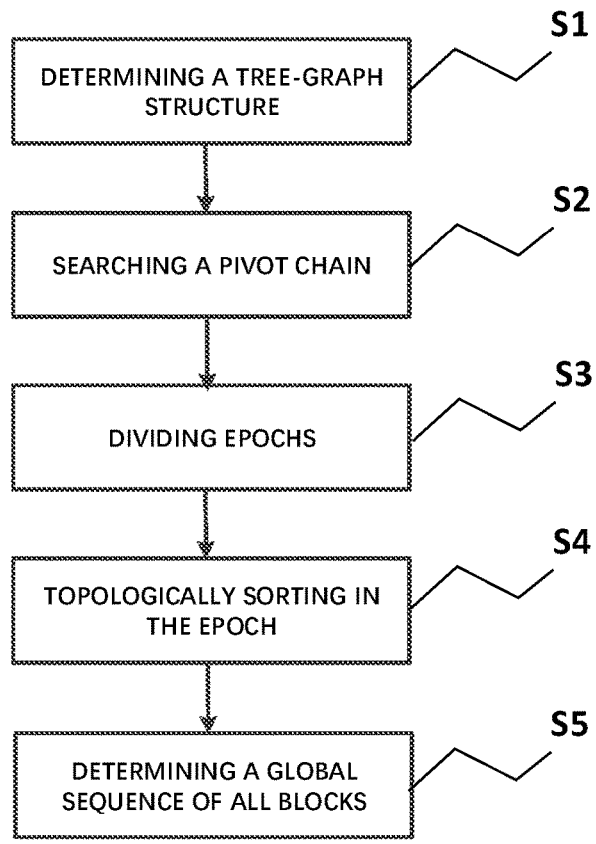
FIG. 5 is a flow chart of sorting all blocks in a tree-graph structure according to a preferred embodiment of the present invention

FIG. 5 is a flow chart of sorting all blocks in a tree-graph structure according to a preferred embodiment of the present invention. There are many methods for looking for a pivot chain, the present invention is not limited to specific method for looking for a pivot chain, for example, in the schematic diagram of a pivot chain shown in FIG. 4, the longest sub-chain can be used to determine the pivot chain: under a longest sub-chain rule, a weight value of each block is the length of the longest chain of the sub-chain thereof, a weight value of the block A is 4, the longest sub-chain thereof is ACEH, and a weight value of the block B is 5, and the longest sub-chain thereof is BFJIK; after the weight value is determined, a block on the longest sub-chain is always selected as a pivot block, from the genesis block Genesis as beginning.

A process of sorting all blocks of the present invention is described below by a method of looking for a pivot chain with the heaviest subtree rule.

Figure 6:
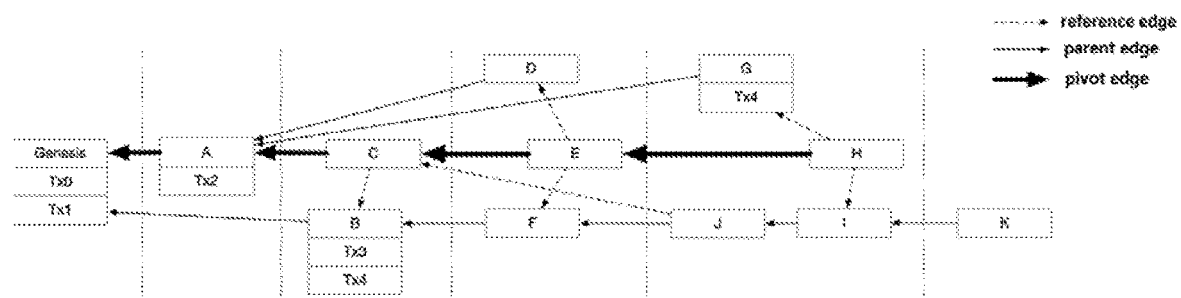
FIG. 6 is a schematic diagram of an Epoch division of a tree-graph structure of a blockchain according to a preferred embodiment of the present invention
Figure 7:
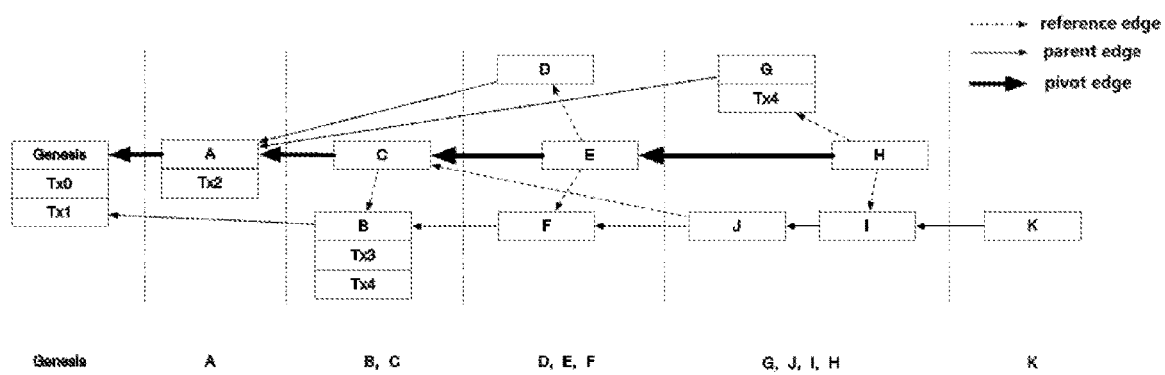
FIG. 7 is a schematic diagram of block sorting within each Epoch of a tree-graph structure of a blockchain according to a preferred embodiment of the present invention

The process of sorting all blocks in the tree-graph structure of the present invention specifically comprises:

Step S1: determining the tree-graph structure as shown in FIG. 3; In fact, the difference between a blockchain system with the tree-graph structure of the present invention and a blockchain system with a chain structure is in that, any block (not including a genesis block Genesis) as a child block will be linked with one parent block to build a parent edge according to the reference relationship, or can be linked with a plurality of parent blocks, and build one parent edge or one reference edge with each parent block so as to build a tree-graph structure;

Step S2: selecting a pivot chain of the tree-graph structure; searching, from the genesis block Genesis of tree-graph structure as beginning, a single chain in which adjacent blocks are linked by parent edges. In the embodiment of the present invention, searching a pivot chain by the heaviest subtree rule, specifically comprises:

Step S21: for any block in the tree-graph structure, selecting a subtree structure with DAG structure by taking the block as an initial block and taking a child block of the block and a descendant block of the block as a node. Referring to the FIG. 4 again, in the tree-graph structure as shown in FIG. 4, for block A, the subtree structure with the block A as an initial block includes the initial block A, child blocks C, D, G, descendant blocks E, H (forming a sub-chain A-C-E-H, a sub-chain A-D-E-H and a sub-chain A-G-H), and descendant blocks J, I, K (forming a sub-chain A-C-J-I-K);

Step S22: accumulating the number of the child blocks and the descendant blocks in the sub-tree structure and taking the accumulated result as a weight of the block. The subtree structure with the block A as the initial block includes child blocks C, D, G, and descendant blocks E, H, J, I, K, so the weight of the block A is 8 (DEHGCJIK);

Step S23: for all blocks in the tree-graph structure, obtaining the weight of each block by step S21 and step S22;

Step S24: sequentially selecting, from the genesis block of the tree-graph structure as beginning, a child block with the maximum weight among the child blocks of the current block as the pivot block, and taking the edge between the current block and its pivot block as a pivot edge. For example, in the child blocks of the genesis block Genesis, the weight of the block A is 8 (DEHGCJIK) and the weight of the block B is 7 (CEHFJIK), so the block A is the pivot block of the genesis block Genesis and the edge between the genesis block Genesis and the block A is the pivot edge. In the child blocks of block A, the weight of the block C is 5 (JIKEH), the weight of the block D is 2 (EH), and the weight of the block G is 1 (H), so the block C is the pivot block of the block A;

Step S25: taking a single chain formed by linking pivot blocks with a pivot edge as a pivot chain. For example, from the genesis block Genesis as beginning, the pivot chain is Genesis-A-C-E-H;

Step S3: dividing all blocks into a plurality of Epochs according to a time sequence arrangement of the pivot blocks. For the pivot blocks on the pivot chain, blocks among other blocks referenced by the pivot blocks, which is not contained in the previous Epoch, will be divided into an Epoch where the current block belongs. For example, for the pivot block H, blocks referred by it include the parent blocks E, G, I, ancient blocks J, D, F, C, B, A and Genesis; since the Genesis, A, C and E themselves are the pivot block, they has been divided into an Epoch where Genesis, A, C and E belong, the block B has been divided into an Epoch where the block C belongs, the Blocks D and F have been divided into an Epoch where the block E belongs, and the undivided blocks are only blocks G, I and J. Therefore, blocks G, I and J are divided into an Epoch where the pivot block H belongs. Since there is only one block on the pivot chain within each Epoch, and the block on the pivot chain is formed by connecting the parent edges and has a definite sequence, there is a definite sequence among the Epochs. On this basis, all the blocks in the tree-graph structure can be fully arranged by only determining the sequence of each block within each Epoch. FIG. 6 is a schematic diagram of an Epoch division of a tree-graph structure of a blockchain according to a preferred embodiment of the present invention. As shown in FIG. 6, the tree-graph shown in FIG. 4 was divided into Epochs according to the above rules; wherein the block K is not a parent block of the pivot block H and is not also an ancient block of the pivot block H. Therefore, the block K is not divided into an Epoch where the pivot block H belongs to or any Epoch before the pivot block H;

Step S4: sorting, in time sequence, blocks in each Epoch to obtain a set sequence of the Epoch. Within each Epoch, all blocks are topologically sorted. If there are a plurality of blocks for which sequence can't be determined by the topological sorting algorithm, the Hash values of the blocks are compared and sorted according to the Hash values. FIG. 7 is a schematic diagram of block sorting within each Epoch of a tree-graph structure of a blockchain according to a preferred embodiment of the present invention. As shown in FIG. 7, the blocks within each Epoch shown in FIG. 6 are sorted.

Step S5: obtaining a global sequence of all blocks of the tree-graph structure according to all set sequences; After the sequence of blocks within each Epoch is determined, the full arrangement of all blocks in the tree-graph structure is determined according to the sequence of the Epochs. Taking the tree-graph structure shown in FIG. 7 as an example, the sequence of all blocks in the whole tree-graph structure is Genesis-A-B-C-D-E-F-G-J-I-H-K.

Figure 8:
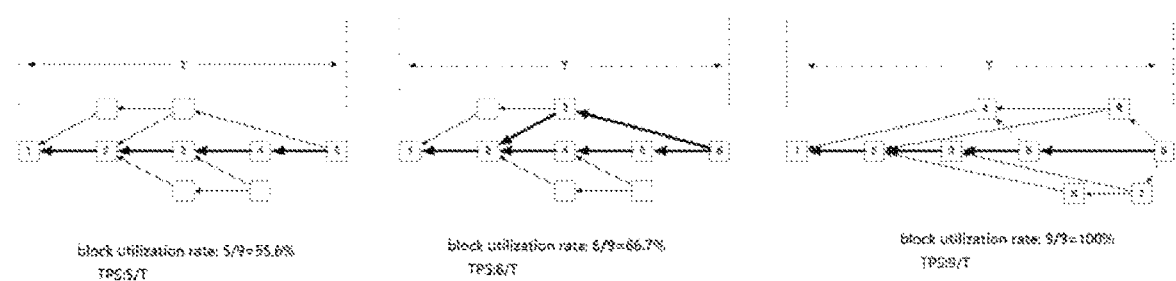
FIG. 8 is a schematic diagram of block utilization rates of a chain structure and a DAG structure of the prior art and a tree-graph structure according to a preferred embodiment of the present invention in an organization manner

FIG. 8 is a schematic diagram of block utilization rates of a chain structure and a DAG structure of the prior art and a tree-graph structure according to a preferred embodiment of the present invention in an organization manner. As shown in FIG. 8, for a plurality of blocks generated in the same time period, in the chain structure, the DAG structure and tree-graph structure, the block utilization rates are gradually improved and the throughputs TPS are also gradually improved.

Figure 9:
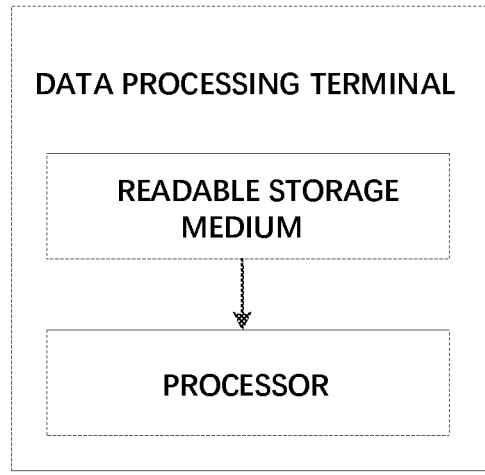
FIG. 9 is a structural schematic diagram of a data processing terminal according to a preferred embodiment of the present invention

FIG. 9 is a structural schematic diagram of a data processing terminal according to a preferred embodiment of the present invention. As shown in FIG. 9, the present invention also proposes a data processing terminal including a processor and a readable storage medium; wherein the processor receives, consensus authenticates and stores blocks in a P2P network by reading executable instructions stored in the readable storage medium, and the readable storage medium stores the executable instructions. When the executable instructions are executed by the processor, the above block sequencing method based on tree-graph structure is implemented. It can be understood by persons skilled in the art that all or a part of the steps in the above method can be accomplished by a program instructing the related hardware (such as a processor), and the program can be stored in a readable storage medium, such as a read-only memory, a disk, or a CD. All or a part of the steps in the above embodiments may also be implemented by using one or more integrated circuits. Accordingly, each module in the above embodiments may be implemented in the form of hardware (for example, the corresponding functions are implemented by an integrated circuit), or in the form of a software function module (for example, the corresponding functions are implemented by executing programs/instructions stored in a memory by a processor). Embodiments of the present invention are not limited to any particular combination of hardware and software.

Figure 10:
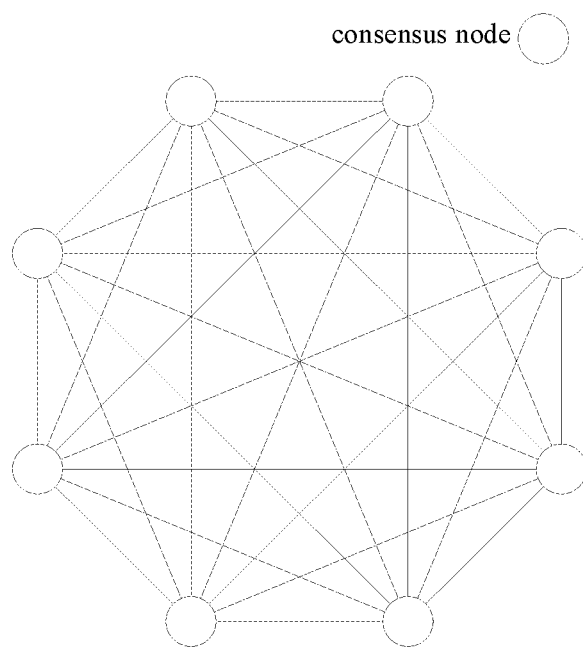
FIG. 10 is a structural schematic diagram of a P2P network according to a preferred embodiment of the present invention

FIG. 10 is a structural schematic diagram of a P2P network according to a preferred embodiment of the present invention. As shown in FIG. 10, the P2P network of the present invention includes a plurality of consensus nodes, and the consensus nodes of the P2P network of the present invention are the data processing terminal described above.

The present invention proposes to organize the blocks mined by the whole network with a tree-graph structure, so as to have higher block utilization rate, improvement in bandwidth resource and computing capability resource of the whole network and higher throughput, compared with the chain structure and DAG structure.

The present invention is applicable to any competing blockchain system, such as the blockchain system based on the PoW consensus. In such systems, a plurality of competing blocks will be generated in the same time period. If all blocks generated in the same time period are organized by the tree-graph structure proposed in the present invention, all competing blocks in each time period can obtain consensus of the whole network, so that block utilization rate is improved, the computing capability and the bandwidth resources of the whole network are enhanced and the system throughput is improved.

Finally, it should be noted that the above embodiments are only used to describe the technical solution of the present invention and not to restrict it. Although the present invention is described in detail with reference to the above embodiments, persons skilled in the art should understand that the present invention may be modified according to the technical solution recorded in the above embodiments or some of technical features thereof can be replaced equally; and such modifications or equivalent replacements shall not make the essence of the corresponding technical solution deviate from the spirit and scope of technical solution in each embodiment of the present invention.

What is claimed is:

1. A block sequencing method based on a tree-graph structure, by increasing number of blocks to obtain consensus of whole network in each time period with improved throughput, the method comprising:

linking, by a hardware processor, all blocks into a tree-graph structure of a directed acyclic graph (DAG) according to reference relationships, wherein, according to the reference relationships, any block as a child block is linked with one or more parent blocks to build one parent edge or one reference edge with each parent block to build the tree-graph structure;

selecting, by the hardware processor, one pivot chain from the tree-graph structure and taking all blocks in the pivot chain as pivot blocks;

dividing, by the hardware processor, according to all time sequence arrangements of the pivot blocks, all blocks into a plurality of Epochs;

sorting, by the hardware processor, in time sequence, blocks in each of the Epochs to obtain a set sequence of the Epoch; and obtaining, by the hardware processor, the consensus of the whole network in each time period, and obtaining a global sequence of all blocks of the tree-graph structure based on all set sequences.

2. The block sequencing method based on the tree-graph structure according to claim 1, wherein the pivot chain is selected by a heaviest subtree rule, and the heaviest subtree rule comprises:

selecting, for any block of the tree-graph structure, a subtree structure in which the block is taken as an initial block, accumulating the number of child blocks and descendant blocks in the subtree structure, and taking the accumulated result as a weight of the block;

selecting, from a genesis block of the tree-graph structure as beginning, a child block with the largest weight among all child blocks of the current block as a pivot block of the current block, and taking a reference edge where the current block and its pivot block are located as a pivot edge; and taking a single chain formed by linking the pivot block with the pivot edge as a pivot chain.

3. The block sequencing method based on the tree-graph structure according to claim 2, wherein, each Epoch includes only one of the pivot blocks.

4. The block sequencing method based on the tree-graph structure according to claim 3, wherein, for any of the pivot blocks, the blocks in all parent blocks and ancient blocks, which are not divided into any Epoch, are divided into an Epoch of the pivot block.

5. The block sequencing method based on the tree-graph structure according to claim 1, wherein, all of the blocks in the Epoch are topologically sorted to obtain a topological sequence of the Epoch and take the topological sequence as the set sequence of the Epoch.

6. The block sequencing method based on the tree-graph structure according to claim 5, wherein, when the topological sequences of a plurality of blocks in the Epoch are juxtaposed, hash values of the blocks of which the topological sequences are juxtaposed are sorted to determine a set sequence of the blocks in the Epoch.

7. A block sequencing system based on a tree-graph structure, by increasing number of blocks to obtain consensus of whole network in each time period with improved throughput, comprising:
a tree-graph structure building processor for linking all blocks into a tree-graph structure of a directed acyclic graph (DAG) according to a reference relationship, wherein, according to the reference relationships, any block as a child block is linked with one or more parent blocks to build one parent edge or one reference edge with each parent block to build the tree-graph structure;
a pivot chain selection processor for selecting one pivot chain from the tree-graph structure, and taking all blocks in the pivot chain as pivot blocks;
a block division processor for dividing all blocks into a plurality of Epochs according to all time sequence arrangements of the pivot blocks;
a set sequence obtaining processor for sorting, in time sequence, blocks in the Epoch to obtain a set sequence of the Epoch; and
a global sequence obtaining processor for obtaining the consensus of the whole network in each time period, and a global sequence of all blocks of the tree-graph structure according to all set sequences.

8. The block sequencing system based on the tree-graph structure according to claim 7, wherein, the pivot chain selection processor selects the pivot chain by a heaviest subtree rule, wherein the heaviest subtree rule comprises:
Selecting, for any block of the tree-graph structure, a subtree structure in which the block is taken as an initial block, accumulating the number of child blocks and descendant blocks in the subtree structure, and taking the accumulated result as a weight of the block;

selecting, from a genesis block of the tree-graph structure as beginning, a child block with the largest weight among all child blocks of the current block as a pivot block of the current block, and taking an edge where the current block and its pivot block are located as a pivot edge; and taking a single chain formed by linking the pivot block with the pivot edge as a pivot chain.

9. The block sequencing system based on the tree-graph structure according to claim 7, wherein, each Epoch divided by the block division processor includes only one of the pivot blocks.

10. The block sequencing system based on the tree-graph structure according to claim 9, wherein, for any of the pivot blocks, the block division processor divides blocks in all parent blocks and ancient blocks, which are not divided into any Epoch, into an Epoch of the pivot block.

11. The block sequencing system based on the tree-graph structure according to claim 7, wherein, the set sequence obtaining processor comprises:
a topological sequence obtaining submodule for obtaining the set sequence of the Epoch according to a topological sequence of all blocks in the Epoch.

12. The block sequencing system based on the tree-graph structure according to claim 11, wherein, the set sequence obtaining processor further comprises:
a hash value sorting submodule for sorting, when the topological sequences of a plurality of blocks in the Epoch are juxtaposed, hash values of the blocks of which the topological sequences are juxtaposed, to determine a set sequence of the blocks of which the topological sequences are juxtaposed in the Epoch.

13. A non-transitory computer readable storage medium containing instructions for executing a block sequencing method based on a tree-graph structure, by increasing number of blocks to obtain consensus of whole network in each time period with improved throughput, and when being executed, the instructions cause a processor to:
link all blocks into a tree-graph structure of a directed acyclic graph (DAG) according to reference relationships, wherein, according to the reference relationships, any block as a child block is linked with one or more parent blocks to build one parent edge or one reference edge with each parent block to build the tree-graph structure;
select one pivot chain from the tree-graph structure and taking all blocks in the pivot chain as pivot blocks;
divide, according to all time sequence arrangements of the pivot blocks, all blocks into a plurality of Epochs;
sort, in time sequence, blocks in each of the Epochs to obtain a set sequence of the Epoch; and
obtain the consensus of the whole network in each time period and a global sequence of all blocks of the tree-graph structure based on all set sequences.

* * * * *